United States Patent [19]

Ferrin et al.

[11] Patent Number: 4,484,934
[45] Date of Patent: Nov. 27, 1984

[54] PHYSICAL SOLVENT FOR GAS SWEETENING

[75] Inventors: Charles R. Ferrin; William P. Manning, both of Sand Springs, Okla.

[73] Assignee: Combustion Engineering, Inc., Windsor, Conn.

[21] Appl. No.: 574,311

[22] Filed: Jan. 27, 1984

[51] Int. Cl.$^3$ .............................................. B01D 53/14
[52] U.S. Cl. ............................................. 55/32; 55/73; 423/228
[58] Field of Search .............. 55/32, 73, 68; 423/228, 423/229; 548/543, 551, 579

[56] References Cited

U.S. PATENT DOCUMENTS

| | | | |
|---|---|---|---|
| 3,377,340 | 4/1968 | Hartwimmer et al. | 548/543 X |
| 3,656,275 | 4/1972 | Hunter | 55/73 X |
| 3,719,749 | 3/1973 | Smith et al. | 423/228 X |
| 3,738,086 | 6/1973 | Bellisio et al. | 55/73 X |
| 3,745,746 | 7/1973 | Psyvas et al. | 55/31 |

*Primary Examiner*—Charles Hart
*Attorney, Agent, or Firm*—Arthur L. Wade

[57] ABSTRACT

This invention relates to a novel solvent, N-2-methoxyethyl-2-pyrrolidone, that can be used in two ways. First, in the pure or undiluted form, it absorbs hydrogen sulfide and other sulfurous gases selectively and simultaneously dries the gas. Second, when mixed with an alkanolamine and water, it is a superior absorbent of mercaptans, sulfides, and disulfides, and removes acid gases. The chemical structure of N-2-methoxyethyl-2-pyrrolidone is shown below.

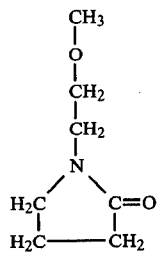

N—Methoxyethyl-2-Pyrrolidone

3 Claims, No Drawings

PHYSICAL SOLVENT FOR GAS SWEETENING

TECHNICAL FIELD

The present invention relates to a physical solvent which will remove acid gases, water, mercaptans, sulfides and disulfides. More particularly, the invention relates to a solvent which can be utilized either in the undiluted form to selectively remove hydrogen sulfide, sulfurous gases, and water from their mixture with other gases; or in the diluted form to remove acid gases, mercaptans, sulfides and disulfides.

BACKGROUND ART

Gas from many wells does not meet the generally accepted pipeline specification of less than ¼ grain hydrogen sulfide per 100 scf and 1 grain total sulfur per 100 scf. The most widely used method for removing acid gases from gas mixtures is to contact the gaseous mixture with an aqueous solution of an alkanolamine. The salts formed by alkanolamine and acid gases present ($H_2S$, $CO_2$) can be decomposed by heating and/or stripping with steam. The alkanolamine solution is regenerated by heating or stripping which allows it to be recycled and reused.

This type of gas process is chemical in nature because chemical reactions are used to remove the acid gases. Another method is based on physical absorption, i.e. the extent to which the acid gases dissolve in the solution. Physical processing is most advantageous when the partial pressure of the acid gases is high, e.g. over 50 psig.

Prior art in gas processing using physical solvents includes: U.S. Pat. Nos. 2,518,752 Chapin, Aug. 15, 1950, 2,547,278 McCartney, May 3, 1957—a mixture of amines and glycols; U.S. Pat. Nos. 3,324,627 Kohrt June 13, 1956, 3,120,933 Thorman et al, Feb. 11, 1964—N-methyl-2-pyrrolidone (m Pyrol); U.S. Pat. No. 4,107,170 Ferrin et al, Aug. 15, 1978—1-formylpiperidine (sweet and dry); U.S. Pat. No. 3,594,985 Ameen et al, July 27, 1971—a mixture of polyethylene glycol dimethylethers (SELEXOL).

The prior art in gas processing using mixtures of an amine, physical solvent and water includes the following solvents: U.S. Pat. Nos. 3,347,621 Papadoulos et al, Oct. 10, 1967, 3,463,603 Freitas et al, Aug. 26, 1969—sulfolane (SULFINOL); U.S. Pat. No. 4,360,363 Ferrin et al, No. 23, 1982—4-propanolpyridine; U.S. Pat. No. 4,372,925 Cornelisse, Mar. 25, 1981—tetraethylene glycol dimethylether.

In the never-ending search for a better solvent, the present invention contemplates the use of N-2 methoxyethyl-2-pyrrolidone as a solvent. Proportioning N-2 methoxyethyl-2-pyrrolidone with amine and water optimizes the solution for selective removal of acid gases and mercaptans from gaseous mixtures.

DISCLOSURE OF THE INVENTION

The present invention contemplates the removal of hydrogen sulfide, mercaptans, disulfides, sulfides, and water by undiluted N-2 methoxyethyl-2-pyrrolidone. The invention further contemplates the absorption of acid gases, mercaptans, sulfides and disulfides by a solvent comprised of 15 to 55% by weight amine, 15 to 35% by weight water, and the balance being N-2 methoxyethyl-2-pyrrolidone.

Other objects, advantages and features of this invention will become apparent to one skilled in the art upon consideration of the written specification and appended claims.

BEST MODE FOR CARRYING OUT THE INVENTION

Table I below provides a comparison of the absorptivities of N-2 methoxyethyl-2-pyrrolidone, 1-formylpiperdine, tetraethylene glycol dimethylether and N-methyl-2-pyrrolidone for hydrogen sulfide, carbon dioxide and propane.

TABLE I

| Solvent | Boiling Point °F. | Absorptivity cc/cc atm | | |
|---|---|---|---|---|
| | | $H_2S$ | $CO_2$ | $C_3H_8$ |
| N—2 Methoxyethyl-2-pyrrolidone | 462 | 32.4 | 3.35 | 3.78 |
| 1-Formylpiperdine | 432 | 31.4 | 3.36 | 4.62 |
| Tetraethylene glycol dimethylether | 529 | 25.5 | 3.57 | 4.63 |
| N—Methyl-2-pyrrolidone | 396 | 43.3 | 3.80 | 3.53 |

From an initial analysis it would appear that the N-methyl-2-pyrrolidone may be the preferred solvent for absorbing hydrogen sulfide—the absorptivity of 43.3 cc/cc atm is the highest value. However, the boiling point of 396° F. is a serious drawback because it limits the degree to which the N-methyl-2-pyrrolidone can be regenerated or purified. U.S. Pat. No. 4,107,270 discloses that 1-formylpiperdine is a better solvent in that a lower circulation rate suffices. Accordingly, comparison with 1-formylpiperdine shows that both the hydrogen sulfide absorptivity and the boiling point of N-2 methoxyethyl pyrrolidone are preferable.

As stated in the Background, the most widely used method for acid gas removal uses an amine which chemically reacts with hydrogen sulfide and carbon dioxide. However, mercaptans, sulfides and disulfides are not removed by this process. The most widely used process for removing these components in the presence of hydrogen sulfide and carbon dioxide is to employ an amine which removes the hydrogen sulfide and carnbon dioxide, and a physical solvent to remove the mercaptans, sulfides and disulfides. Since the mercaptans, sulfides and disulfides are usually present in small amounts, a large amount of the physical solvent is not required.

TABLE II

Solubility of $CH_3SH$ (methylmercaptan) in Aqueous Solutions of MDEA (methyldiethanolamine) and Physical Solvent

| Physical Solvent | Vol % | MDEA Vol % | $H_2O$ Vol % | $CH_3SH$ Solubility cc/cc atm 76° F. |
|---|---|---|---|---|
| N—2 Methoxyethyl-2 pyrrolidone | 25 | 50 | 25 | 35.6 |
| Tetraethylene glycol dimethylether | 25 | 50 | 25 | 31.9 |
| Sulfolane | 25 | 50 | 25 | 28.4 |
| 4-propanol pyridine | 25 | 50 | 25 | 23.5 |

Table II above compares the absorptivity of methyl mercaptans using several previously disclosed physical solvents and the newly disclosed N-2 methoxyethyl-2-pyrrolidone. Because all of the above aqueous solutions are regenerated at 10–15 psig and 245° to 250° F., the preferred solvent is the one with the greatest affinity for methyl mercaptan; this is clearly the N-2 methoxyethyl-2-pyrrolidone. Note that the methoxyethyl pyrrolidone is about 25% better than sulfolane which is the physical solvent in the most widely used chemical-physical solvent process for acid gases (Shell Oil SULFINOL process).

The physical-chemical process may also be used where hydrogen sulfide and carbon dioxide are present at high partial pressures. These components then are largely removed by the physical solvent component.

From the foregoing, it will be seen that this invention is one well adapted to attain all the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth is to be interpreted in an illustrative and not in a limiting sense.

We claim:

1. The process for the absorption and removal of hydrogen sulfide and mercaptans and sulfides and disulfides and water from a mixture of gases, which comprises, scrubbing the mixture of gases with N-2 methoxyethyl-2-pyrrolidone in an absorption zone in which the hydrogen sulfide and mercaptans and sulfides and disulfides and water are absorbed, conducting the solvent containing the absorbed gases and water to a desorption zone, liberating the absorbed gases and water from the solvent to thereby regenerate the solvent, and recycling the regenerated solvent to the absorption zone.

2. The process for the absorption and removal of acid gases and mercaptans and sulfides and disulfides from a mixture of gases, which comprises, scrubbing the mixture of gases with a solution of amine and water and N-2 methoxyethyl-2-pyrrolidone in an absorption zone in which the acid gases and mercaptans and sulfides and disulfides are absorbed, conducting the solvent containing the absorbed gases to a desorption zone, liberating the absorbed acid gases and mercaptans and sulfides and disulfides from the solvent to thereby regenerate the solvent, and recycling the regenerated solvent to the absorption zone.

3. The process of claim 2, wherein, the solution comprises 15 to 55% by weight amine and 15 to 35% by weight water and the balance being N-2 methoxyethyl-2-pyrrolidone.

* * * * *